United States Patent
Sekiyama et al.

(10) Patent No.: US 7,912,591 B2
(45) Date of Patent: Mar. 22, 2011

(54) VEHICLE CONTROL SYSTEM

(75) Inventors: Hiroaki Sekiyama, Minato-ku (JP);
Toshiyuki Namba, Edogawa-ku (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 344 days.

(21) Appl. No.: 11/992,165

(22) PCT Filed: Aug. 2, 2007

(86) PCT No.: PCT/JP2007/065145
§ 371 (c)(1),
(2), (4) Date: Mar. 18, 2008

(87) PCT Pub. No.: WO2008/016104
PCT Pub. Date: Feb. 7, 2008

(65) Prior Publication Data
US 2009/0265046 A1    Oct. 22, 2009

(30) Foreign Application Priority Data
Aug. 3, 2006   (JP) .................................. 2006-212458

(51) Int. Cl.
*G05D 1/00*   (2006.01)
(52) U.S. Cl. .................. 701/1; 701/2; 701/35; 701/300; 340/426.16; 340/426.19; 340/438
(58) Field of Classification Search ............... 701/2, 35, 701/213, 300, 1; 342/357.1, 357.13, 357.25; 340/426.16, 426.19, 435, 438
See application file for complete search history.

(56) References Cited

FOREIGN PATENT DOCUMENTS

| | | |
|---|---|---|
| DE | 198 26 904 A1 | 12/1999 |
| EP | 19826904 * | 12/1999 |
| EP | 1 466 795 A1 | 10/2004 |
| EP | WO2005024734 * | 3/2005 |
| JP | 06-199191 A | 7/1994 |
| JP | 06-206475 A | 7/1994 |
| JP | 2001-317398 A | 11/2001 |
| JP | 2002-083393 A | 3/2002 |
| JP | 2003-042045 A | 2/2003 |
| JP | 2004-218444 A | 8/2004 |
| JP | 2004-346508 A | 12/2004 |
| JP | 2005-318335 A | 11/2005 |
| JP | 2005-319911 A | 11/2005 |
| JP | 2006-044491 A | 2/2006 |
| WO | 2005/024734 A1 | 3/2005 |

* cited by examiner

*Primary Examiner* — Gertrude Arthur Jeanglaud
(74) *Attorney, Agent, or Firm* — Kenyon & Kenyon LLP

(57) ABSTRACT

A disclosed vehicle control system comprises a mobile terminal that transmits a current location of the mobile terminal; a receiving portion that is installed in a vehicle and receives the current location transmitted from the mobile terminal; a vehicle location detecting portion that detects a current location of the vehicle; a controlling portion that controls a vehicle apparatus installed in the vehicle in accordance with a positional relationship between the current position of the mobile terminal received by the receiving portion and the current location of the vehicle detected by the vehicle location detecting portion; and a memory portion that stores behavioral pattern information of a user of the vehicle. The controlling portion controls the vehicle apparatus in accordance with the behavioral pattern information stored in the memory portion and the positional relationship between the current location of the mobile terminal and the current location of the vehicle.

7 Claims, 2 Drawing Sheets

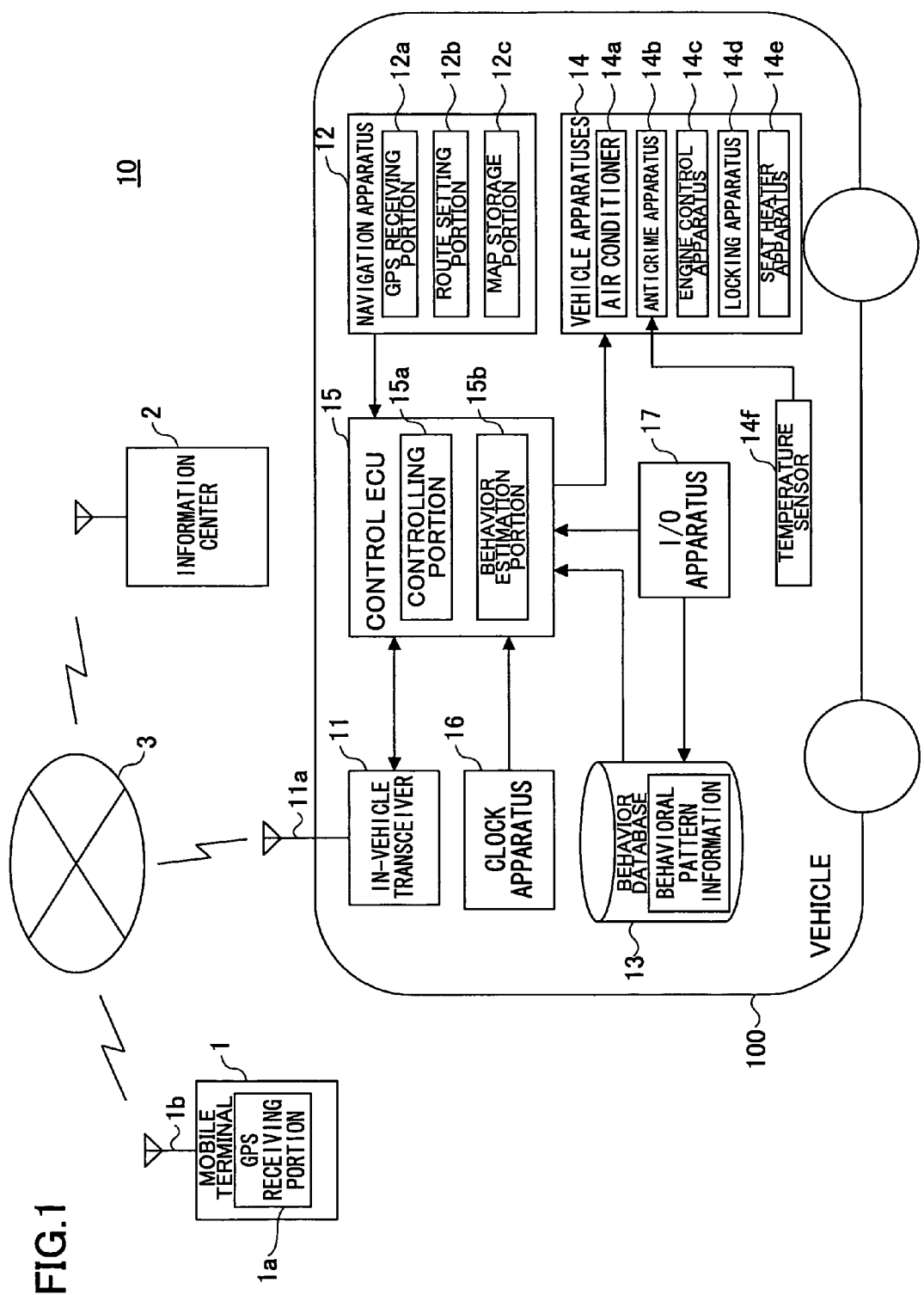

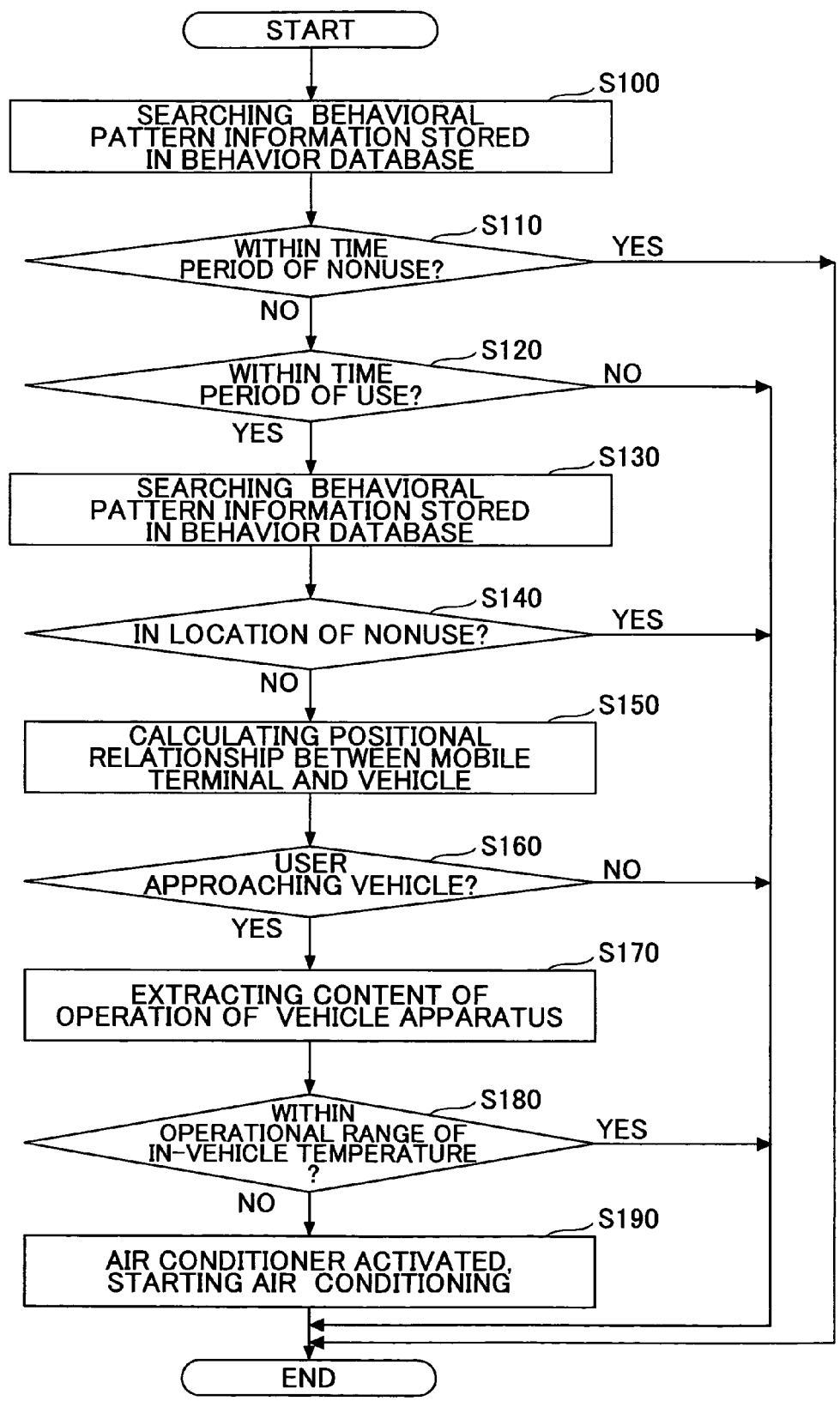

ized that the vehicle apparatus can be appropriately controlled in consid-

VEHICLE CONTROL SYSTEM

This is a 371 national phase application of PCT/JP2007/065145 filed 2 Aug. 2007, claiming priority to Japanese Patent Application No. 2006-212458 filed 3 Aug. 2006, the contents of which are incorporated herein by reference.

TECHNICAL FIELD

The present invention relates to a vehicle control system that controls vehicle apparatuses installed in a vehicle, in accordance with a positional relationship between a current location of a mobile terminal and a current location of the vehicle.

BACKGROUND ART

There has long been known a vehicle instruction system that sends predetermined instructions for activating an anti-theft apparatus, warming up a vehicle, activating an air conditioner, and the like in accordance with a distance and a positional relationship between a mobile communications apparatus and the vehicle (see, e.g., Patent Document 1).
Patent Document 1: Japanese Laid-Open Patent Publication No. 2005-3183355.

DISCLOSURE OF INVENTION

Problems to be Solved by the Invention

In the above vehicle instruction system, the predetermined instructions are inflexibly determined in accordance with the distance and the positional relationship between the mobile communications apparatus and the vehicle. Therefore, instructions may be made in contradiction to a behavioral pattern of the user.

The present invention has been made in order to eliminate the above problem, and the objective of the present invention is to appropriately control the vehicle apparatuses installed in the vehicle.

Means for Solving the Problems

In order to accomplish the above objective, one embodiment of the present invention provides a vehicle control system that includes a mobile terminal that transmits a current location of the mobile terminal, a receiving portion that is installed in a vehicle and receives the current location transmitted from the mobile terminal, a vehicle location detecting portion that detects a current location of the vehicle, a controlling portion that controls a vehicle apparatus installed in the vehicle in accordance with a positional relationship between the current position of the mobile terminal received by the receiving portion and the current location of the vehicle detected by the vehicle location detecting portion, and a memory portion that stores behavioral pattern information of a user of the vehicle. The controlling portion controls the vehicle apparatus in accordance with the behavioral pattern information stored in the memory portion and the positional relationship between the current location of the mobile terminal and the current location of the vehicle.

According to this embodiment, the controlling portion controls the vehicle apparatus in accordance with the behavioral pattern stored in the storing portion and the positional relationship between the current location of the mobile terminal and the current location of the vehicle. With this, the vehicle apparatus can be appropriately controlled in consideration of the behavioral pattern of the user and the positional relationship between the vehicle and the user carrying the mobile terminal.

In the embodiment, the behavioral pattern information stored in the memory portion may include at least one of time when the vehicle is used, a location of the vehicle, and content about operation of the vehicle apparatus. With this, the vehicle apparatus can be preferably controlled in accordance with the time when the vehicle is used by the user, the location of the vehicle, or the content about the operation of the vehicle apparatus. For example, an in-vehicle transceiver may be turned to the off-standby state (turned off) outside of the time when the vehicle is being used, thereby reducing standby electricity consumption. By the way, the behavioral pattern information may be obtained by associating time when the vehicle is used, a location of the vehicle, and content about operation of the vehicle apparatus with one another.

In the embodiment, the receiving portion and the mobile terminal communicate via an information center, where the memory portion is arranged in one of the vehicle, the mobile terminal, and the information center, and where the behavioral pattern information stored in the memory portion may be subjected to one of registration, alteration, and deletion via one of the mobile terminal, the information center, and an input/output apparatus arranged in the vehicle. With this, the behavioral pattern information is kept reliable and updated, since the user can carry out at least one of registration, alteration, and deletion of the behavioral pattern information in any location and at any time (e.g., immediately).

In the embodiment, the receiving portion and the mobile terminal communicate via an information center, where the memory portion is arranged in the vehicle, and where the behavioral pattern information stored in the memory portion may be subjected to one of registration, alteration, and deletion only via the input/output apparatus arranged in the vehicle. With this, communications cost can be reduced for the communications between the receiving portion and the information center when the behavioral pattern information is registered, deleted, or altered. Moreover, since access to the behavior database from outside is restricted, the information in the behavior database is kept highly confidential.

In the embodiment, the controlling portion may include a behavior estimation portion that estimates the content about the operation of the vehicle apparatus in accordance with the behavioral pattern information stored in the memory portion, and the content about the operation of the vehicle apparatus, the content being estimated by the behavior estimation portion, may be performed when the distance between the current location of the mobile terminal and the current location of the vehicle is less than a predetermined distance. With this, the content about the operation of the vehicle apparatus estimated in accordance with the behavioral pattern of the user can be automatically carried out depending on the distance between the user and the vehicle.

In the embodiment, the behavioral pattern information may further include a time period of nonuse when the vehicle is not being used by the user, and the controlling portion may prevent the content about the operation of the vehicle apparatus from being performed during the time period of nonuse. With this, the vehicle apparatus can be assuredly prevented from malfunctioning during the time period of nonuse.

In the embodiment, the behavioral pattern information may further include a location of nonuse where the vehicle is not used by the user, and the controlling portion may prevent the content about the operation of the vehicle apparatus from being performed when the vehicle is in the location of nonuse.

With this, the vehicle apparatus can be assuredly prevented from malfunctioning when the vehicle is in the location of nonuse.

Advantage of the Invention

According to embodiments of the present invention, the vehicle apparatuses installed in a vehicle can be appropriately controlled.

BRIEF DESCRIPTION OF THE DRAWINGS

FIG. 1 is a schematic diagram of an example of a configuration of a vehicle control system according to one embodiment of the present invention; and FIG. 2 is a flowchart illustrating an example of a control process flow of the vehicle control system according to the embodiment of the present invention.

| EXPLANATION FOR REFERENCE NUMBER | |
|---|---|
| 1 | mobile terminal |
| 2 | information center |
| 10 | vehicle control system |
| 11 | in-vehicle transceiver |
| 12 | navigation apparatus |
| 13 | behavior database |
| 14 | vehicle apparatuses |
| 15 | control ECU |
| 15a | controlling portion |
| 15b | behavior estimation portion |
| 16 | clock apparatus |
| 17 | input/output apparatus |

BEST MODE FOR CARRYING OUT THE INVENTION

Referring to the accompanying drawings, preferred embodiments for carrying out the present invention are described with reference to examples. FIG. 1 is a schematic block diagram of an example of a vehicle control system according to one embodiment of the present invention. A vehicle control system 10 according to this example includes a mobile terminal 1, an in-vehicle transceiver (receiving portion) 11 that transmits/receives data to/from the mobile terminal 1, a navigation apparatus (vehicle location detecting portion) 12 that detects a current location of a vehicle 100, a behavior database (memory unit) 13 that stores information on a behavioral pattern of a user (e.g., an owner of the vehicle), a control ECU (controlling portion) 15 that controls vehicle apparatuses 14 installed in the vehicle 100, and a clock apparatus 16 that detects a present year, month, date and time.

The mobile terminal 1 incorporates a Global Positioning System (GPS) receiving portion 1a that detects a current location of the mobile terminal 1. The mobile terminal 1 may be any terminal such as a mobile telephone, a portable computer, or the like. The GPS receiving portion 1a receives GPS radio waves and computes the current location of the mobile terminal 1. The mobile terminal 1 has a display portion made of, for example, a liquid crystal screen that displays various types of information, and plural buttons that enable input operations.

The in-vehicle transceiver 11 is, for example, a Data Communication Module (DCM) apparatus, an in-vehicle telephone, or the like, installed in the vehicle 100. The in-vehicle transceiver 11 transmits/receives data to/from the mobile terminal 1 via antennas 1b, 11a.

By the way, while the in-vehicle transceiver 11 serves as a server and is configured to transmit/receive data to/from the mobile terminal 1 via an information center 2 and a communication network 3, the in-vehicle transceiver 11 may be configured to directly communicate with the mobile terminal 1, not via the information center 2 and the communication network 3.

For example, the mobile terminal 1 transmits data on the current location of the mobile terminal 1, the current location having been detected by the GPS receiving portion 1a, to the in-vehicle transceiver 11 via the information center 2 and the communications network 3. The in-vehicle transceiver 11 is connected to the control ECU 15 and transmits the received data to the control ECU 15. In addition, the in-vehicle transceiver 11 transmits data received from the control ECU and transmits this received data to the outside such as the information center 2 or the like.

The navigation apparatus 12 has a GPS receiving portion 12a that receives the GPS radio waves transmitted from plural GPS satellites so as to detect the current location of the vehicle 100, a route setting portion 12b that plans a travel route to a destination, and a map storage portion 12c that stores terrain information.

By the way, while the GPS receiving portion 12a is incorporated in the navigation apparatus 12, the GPS receiving portion 12a may be an independent element. The navigation apparatus 12 is connected to the control ECU 15 and transmits data on the current location of the vehicle 100 to the control ECU 15, for example.

The behavior database 13 is composed of, for example, a hard-disk drive and stores plural behavioral patterns of the user in the form of tables, maps, or the like. The behavior database 13 stores as behavioral pattern information, for example, when and how the vehicle 100 is used, location of the vehicle 100, and content about the operation of the vehicle apparatuses 14, all of which are associated with one another.

Specifically, when a user behavioral pattern is "activating an air conditioner 14a of the vehicle 100 in his/her residence parking lot in a time period of 7 am to 8 am", "time period of use: 7 am to 8 am, vehicle location: residence parking lot, content about operation of vehicle apparatuses 14: activating the air conditioner 14a" are stored in association with one anther in the behavior database 13. The behavior database 13 stores various arbitrary types of behavioral pattern information.

In addition, the behavioral pattern information may include, "time period of use: 6 am to 7 am, vehicle location: residence parking lot, content about the operation of vehicle apparatuses 14: activating the engine for warming-up" or "time period of use: 8 pm to 9 pm, vehicle location: long-term parking lot, content about the operation of vehicle apparatuses 14: activating a seat heater apparatus 14e".

Moreover, the behavioral pattern information may include a time period of nonuse indicating that the vehicle 100 is not expected to be used. For example, when the user does not use the vehicle 100 for an extended period of time due to a business trip in his/her schedule, the period of time is assumed to be the time period of nonuse. (This time period includes year, month, date, and time). By the way, such schedule information may be stored in advance in the mobile terminal 1 of the user and automatically transmitted to the behavior database 13 through wireless communications between the mobile terminal 1 and the in-vehicle transceiver 11 so as to be stored in the behavior database 13.

Furthermore, the behavioral pattern information may include a location of nonuse indicating a location (e.g., a parking lot at an airport) where the vehicle 100 is not used for a predetermined extended period of time (e.g., 6 hours or more). An example of the location of nonuse may be a parking lot at an airport. When the vehicle 100 is parked in the parking lot at the airport, the user tends to go far away and thus the vehicle 100 is expected not to be used for a long time after having been parked.

The system 100 is configured so that the behavioral pattern information of the user can be newly registered, modified, deleted. For example, the behavior database 13 may be connected to an input/output apparatus device 17 having a touch-panel display.

The user can register new behavioral pattern information in the behavior database 13, and modify, edit, and delete the behavioral pattern information that has already been registered, via the touch-panel display of the input/output apparatus device 17. Behavioral pattern information input via the touch-panel display of the input/output apparatus device 17 is stored in the behavior database 13 via the input/output apparatus device 17.

Moreover, the user may register new behavioral pattern information in the behavior database 13, and modify, edit, and delete the pre-registered behavioral pattern information via the mobile terminal 1. Behavioral pattern information input via the mobile terminal 1 is stored in the behavior database 13 via the mobile terminal 1, the information center 2, and the in-vehicle transceiver 11. With this, the user carrying the mobile terminal 1 can register, modify, edit, and delete the behavioral pattern information anywhere and anytime, thereby providing the user with improved convenience. In addition, the behavioral pattern information becomes reliable and updated.

The clock apparatus 16 has a calendar function that detects the present year, month, and date (including national holidays), and a clock function that detects the present time. By the way, the clock apparatus 16 may be incorporated in the control ECU 15.

The control ECU 15 controls the vehicle apparatuses 14 installed in the vehicle 100. The vehicle apparatuses 14 may include optional apparatuses for controlling the vehicle, including the air conditioner 14a for air-conditioning the in-vehicle environment, an anticrime (security) apparatus 14b that prevents a third party from entering the vehicle, an engine control apparatus 14c that starts/stops the engine, a locking device 14d that locks/unlocks doors of the vehicle 100, the seat heater apparatus 14e that heats vehicle seats, and the like. By the way, the in-vehicle transceiver 11 may be included in the vehicle apparatuses 14.

The air conditioner 14a has cooling and heating functions so as to control the in-vehicle temperature at a predetermined temperature. When the security apparatus 14b is activated, the security apparatus 14b detects a third party entry by employing a shock sensor such as an acceleration sensor that detects shock applied to the vehicle 100 and/or a camera that captures an image of the vehicle cabin, and reports the entry to the user.

The control ECU (Electronic Control Unit) 15 is composed of a micro-computer and performs various processes in accordance with controlling and computing programs. In addition, the control ECU 15 has a CPU (Central Processing Unit) that mainly administers various controls, a ROM (Read Only Memory) that stores an execution program of the CPU, a readable/rewritable RAM (Random Access Memory) that stores computational results and the like, a timer, a counter, an input interface, an output interface, and the like.

The control ECU 15 has a controlling portion 15a that transmits a control signal to the vehicle apparatuses 14 so as to control the vehicle apparatuses 14, and a behavior estimation portion 15b that estimates the behavioral pattern of the user. By the way, the controlling portion 15a and the behavior estimation portion 15b may be stored in the ROM and realized by a program that runs on the CPU.

The controlling portion 15a transmits a control signal, for example, to the air conditioner 14a so as to activate the air conditioner 14a. When the air conditioner 14a is activated, the air conditioner 14a controls the in-vehicle temperature to be a predetermined temperature. In addition, the controlling portion 15a transmits a control signal to the security apparatus 14b so as to start/stop the security apparatus 14b. Moreover, the controlling portion 15a transmits a control signal to the engine control apparatus 14c so as to start a warm-up operation of the engine.

The controlling portion 15a transmits a control signal to the security apparatus 14b so as to change security levels of the security apparatus 14b. Specifically, the controlling portion 15a may control the security apparatus 14b so as to enhance the security level of the security apparatus 14b by activating all break-in sensors (e.g., the shock sensors and cameras). To the contrary, the controlling portion 15a may control the security apparatus 14b so as to reduce the security level of the security apparatus 14b by activating only a part of break-in sensors (e.g., the above shock sensors and cameras).

The above-stated contents about the operations of the individual vehicle apparatuses 14 are included in the behavioral pattern information of the behavior database 13. However, the contents about the operations of the vehicle apparatuses 14 are not limited to the above; any operations of the vehicle apparatuses 14 may be included.

The behavior estimation portion 15b estimates a behavioral pattern of the user in accordance with the behavioral pattern information stored in the behavior database 13. The behavior estimation portion 15b estimates the behavioral pattern by extracting the content about the operation of the vehicle apparatuses 14 from the corresponding behavioral pattern information in accordance with, for example, the present year, month, date, and time detected by the clock apparatus 1 and the current location of the vehicle 100 detected by the navigation apparatus 12.

For a more specific description, it is assumed that the behavior database 13 stores "time period of use: 7 am to 8 am, vehicle location: residence parking lot, content about the operation of vehicle apparatus 14: activating the air conditioner 14a" in an associated manner.

In this case, when the behavior estimation portion 15b determines, for example, that the present time detected by the clock apparatus 16 is 7 o'clock and the current location of the vehicle 100 detected by the navigation apparatus 12 is the residence parking lot, the behavior estimation portion 15b extracts the content about the operation of the air conditioner 14a, which is "activating the air conditioner 14a" so as to estimate the behavioral pattern of the user.

FIG. 2 is a flowchart illustrating an example of a control process flow of the vehicle control system 10 according to this example of an embodiment of the present invention. The control process flow shown in FIG. 2 is repeated at every short period of predetermined time.

The behavior estimation portion 15b of the control ECU 15 searches the behavioral pattern of the user stored in the behavior database 13 (S100).

Next, the behavior estimation portion 15b compares a time period of nonuse stored in the behavior database 13 with the present year, month, and day detected by the clock apparatus 16 so as to determine whether the present year, month, and day fall within the time period of nonuse (S110).

By the way, the time period of nonuse as the behavioral pattern information may be a long time period of absence of the user in the behavior database 13. In this case, a user approaching determining process (S160) (described later) is not carried out, when the user is determined to be absent for a long time in the above determining process (S110). Therefore, since the vehicle apparatuses 14 are not activated, the system 100 is assuredly prevented from malfunctioning.

When the behavior estimation portion 15b determines that the present year, month, and date do not fall within the time period of nonuse (S110: No), the behavior estimation portion 15b compares the present year, month, and date with the time period of use in the behavioral pattern information stored in the behavior database 13 so as to determine whether the present year, month, and date fall within the time period of use in the behavioral pattern information (S120).

By the way, plural time periods of use are set in the behavior database 13 as stated above, and the location of the vehicle 100 and the content about the vehicle apparatuses 14 are stored in association with the corresponding time periods of use.

On the other hand, when the behavior estimation portion 15b determines that the present year, month, and date fall with the time period of nonuse (S110: Yes), this routine of the control process is completed. By the way, the in-vehicle transceiver 11 may be turned off since it is expected that no communications are to be carried out between the mobile phone 11 and the vehicle 100. With this, use of standby electricity can be reduced.

When the behavior estimation portion 15b determines that the present time detected by the clock apparatus 16 falls within the time period of use in the behavioral pattern information (S120: Yes), the behavior estimation portion 15b searches for a location of nonuse in the behavioral pattern information stored in the behavior database 13 so as to determine whether the current location 100 detected by the navigation apparatus 12 is in the location of nonuse (S140).

The location of nonuse may be the airport parking lot, as stated above, as the behavioral pattern information in the behavior database 13. In this case, when it is determined that the vehicle 100 is parked in the airport parking lot in the above determining process (S140), the user approaching determining process (S160) (described later) is not carried out. Therefore, since the vehicle apparatuses 14 are not activated, the system 100 is assuredly prevented from malfunctioning during absence of the user due to, for example, a trip far away from the airport.

When the behavior estimation portion 15b determines that the vehicle 100 currently does not exist in the location of nonuse in the behavioral pattern information (S140: No), the behavior estimation portion 15b calculates a positional relationship between the current location of the mobile terminal 1 possessed by the user and the current location of the vehicle 100.

The behavior estimation portion 15b may calculate the distance between the current location of the mobile terminal 1 and the current location of the vehicle 100, in accordance with the current location of the mobile terminal 1 transmitted from the mobile terminal 1 and the current location of the vehicle detected by the navigation apparatus 12 (S150).

On the other hand, when the behavior estimation portion 15b determines that the vehicle 100 is currently in the location of nonuse in the behavioral pattern information (S140: Yes), this routine of the control process in completed. By the way, the in-vehicle transceiver 11 may be turned off, similar to the above, thereby reducing standby electricity use.

The controlling portion 15a determines whether the distance between the current location of the mobile terminal 1 and the current location of the vehicle 100, the distance having been calculated by the behavior estimation portion 15b, is within a predetermined distance (e.g., a distance in which the user can have visual contact with the vehicle 100), and whether the user carrying the mobile terminal 1 approaches the vehicle 100 (S160).

When the controlling portion 15a determines that the user carrying the mobile terminal 1 approaches the vehicle 100 (S160: Yes), the controlling portion 15a extracts the content about the operation of the vehicle apparatuses 14 to be operated, in accordance with the behavioral pattern information stored in the behavior database 13 (S170).

For example, the controlling portion 15a extracts the content about the operation of the vehicle apparatuses 14 corresponding to the present time detected by the clock apparatus 16 and the current location of the vehicle 100 detected by the navigation apparatus 12 in the behavioral pattern information stored in the behavior database 13.

For a more specific description, it is assumed that the behavior database 13 stores "time period of use: 7 am to 8 am, vehicle location: residence parking lot, content about operation of vehicle apparatuses 14: activating the air conditioner 14a" in an associated manner.

When the controlling portion 15a determines that the present time is 7 o'clock detected by the clock apparatus 16 and the current location of the vehicle 100 detected by the navigation apparatus 12 is the residence parking lot, the behavior estimation portion 15b extracts the content about the operation of the vehicle apparatuses 14, which is "activating the air conditioner 14a".

Then, the controlling portion 15a determines whether a temperature in the vehicle 100 detected by a temperature sensor 14f is lower than a predetermined set temperature (or in an operational range) (S180). When the controlling portion 15a determines that the temperature in the vehicle 100 detected by the temperature sensor 14f is lower than the predetermined set temperature range (S180: No), the controlling portion 15a transmits to the air conditioner 14a a control signal for activating and starting air conditioning (S190). Upon reception of the control signal, the air conditioner 14a starts air heating (pre-heating) so as to increase the temperature in the vehicle 100 to the predetermined set temperature range. On the other hand, when the controlling portion 15a determines that the temperature in the vehicle 100 is within the predetermined set temperature range (S180: Yes), this routine of the control process is completed.

In the vehicle control system 10 according to this example, the controlling portion 15a of the control ECU 15 controls the vehicle apparatuses 14 in accordance with the behavioral pattern information of the user stored in the behavior database 13 and the positional relationship between the current location of the mobile terminal 1 and the current location of the vehicle 100. With this, the vehicle apparatuses 14 can preferably be controlled in consideration of the behavioral pattern of the user and the positional relationship between the user carrying the mobile terminal 1 and the vehicle 100.

Although preferred embodiments of the present invention have been described in reference to the above example, the present invention is not limited to this example. Various modifications and replacements may be made in the above example without departing the scope of the present invention.

For example, although the behavior database 13 that stores the behavioral pattern information of the user is arranged in the vehicle 100 in the above example, the behavior database 13 may be arranged in the mobile terminal 1 or the information center 2.

In addition, when the behavior database 13 is arranged in the mobile terminal 1, new behavioral pattern information may be input to the behavior database 13 of the mobile terminal 1 and the pre-stored behavioral pattern information may be changed or deleted in the behavior database 13 of the mobile terminal 1 via the information center 2 or the input/output apparatus device 17 of the vehicle 100.

Moreover, when the behavior database 13 is arranged in the information center 2, new behavioral pattern information may be registered in the behavior database 13 of the information center 2 and the pre-stored behavioral pattern information may be changed or deleted in the behavior database 13 of the information center 2 via the mobile terminal 1 or the input/output apparatus device 17 of the vehicle 100.

The above example may be configured so that new behavioral pattern information is registered in the behavior database 13 and the pre-stored behavioral pattern information is changed or deleted in the behavior database 13 only via the input/output apparatus device 17 arranged in the vehicle 100. With this, no communications are needed between the mobile terminal 1 or the information center 2 and the in-vehicle transceiver 11 at the time of registration, deletion, and/or change of the behavioral pattern information, thereby reducing telecommunication cost. Moreover, since external access to the behavior database 13 is restricted, the information in the behavior database 13 is kept highly confidential.

In the above example, the behavioral pattern information stored in the behavior database 13 is configured to be subjected to learnability. For example, times of the vehicle apparatus 14 being used, locations of the vehicle 100, and contents about the operations of the vehicle apparatuses 14 are automatically stored in the behavior database 13 and associated with one another in a probability (frequency) order. In this case, the behavior database 13 may update the behavioral pattern information that has already been stored, in accordance with such learning. With this, the behavioral pattern information that has been stored in the behavior database 13 may correspond to an actual behavioral pattern of the user.

Moreover, in the above example, the controlling portion 15a of the control ECU 15 may control the security apparatus 14b so as to reduce the security level of the security apparatus 14b when the distance between the current location of the mobile terminal 1 and the current location of the vehicle 100 is within a predetermined distance, or when the user is in the vicinity of the vehicle 100 (the user can have visual contract with the vehicle 100, or the user is near the vehicle 100 so that he/she can immediately return to the vehicle 100). With this, the security level of the vehicle 100 is preferably reduced, thereby securely preventing the security apparatus 14b from malfunctioning.

For example, when the controlling portion 15a determines that the distance between the current location of the mobile terminal 1 transmitted from the mobile terminal 1 and the current location of the vehicle 100 detected by the navigation apparatus 12 is within a predetermined distance, the controlling portion 15a transmits a control signal so as to reduce the security level.

In the above example, the controlling portion 15a of the control ECU 15 may control the vehicle apparatus 14 in accordance with the current location of the mobile terminal 1 transmitted from the mobile terminal 1.

For example, the controlling portion 15a may control so as to turn the in-vehicle transceiver 11 off when the controlling portion 15a determines that the mobile terminal 1 currently exists in a transport vehicle other than his/her vehicle (e.g., a train, another vehicle, an airplane, or the like). With this, when it is expected that the user will go far away in the other transport vehicle and will not come back for a long time, turning the in-vehicle transceiver 11 off can reduce energy consumed by the vehicle 100.

In the above example, when the controlling portion 15a of the control ECU 15 determines that the distance between the current location of the mobile terminal 1 and the current location of the vehicle 100 is within a predetermined distance (e.g., the user is in close range of the vehicle 100 but has difficulty in making visual contact with the vehicle 100), the controlling portion 15a transmits an instruction signal to the mobile terminal 1 so as to allow the mobile terminal 1 to display the location of the vehicle 100 on the display of the mobile terminal 1. With this, the user can confirm the location of the vehicle 100 on the display of the mobile terminal 1 at an appropriate time.

INDUSTRIAL APPLICABILITY

The present invention may be applicable to a vehicle control system that controls a vehicle apparatus installed in a vehicle, in accordance with a positional relationship between a current location of a mobile terminal and a current location of the vehicle. Appearance, weight, size, traveling performance, and the like of the vehicle in which the vehicle apparatus is installed are not considerations.

The present international application claims priority based on Japanese Patent Application No. 2006-212458, filed on Aug. 3, 2006, the entire contents of which are hereby incorporated by reference.

The invention claimed is:

1. A vehicle control system comprising:
   a mobile terminal that transmits a current location of the mobile terminal;
   a receiving portion that is installed in a vehicle and receives the current location transmitted from the mobile terminal;
   a vehicle location detecting portion that detects a current location of the vehicle;
   a controlling portion that controls a vehicle apparatus installed in the vehicle in accordance with a positional relationship between the current position of the mobile terminal received by the receiving portion and the current location of the vehicle detected by the vehicle location detecting portion; and
   a memory portion that automatically creates and stores behavioral pattern information of a user of the vehicle;
   wherein the controlling portion controls the vehicle apparatus in accordance with the behavioral pattern information stored in the memory portion and the positional relationship between the current location of the mobile terminal and the current location of the vehicle.

2. The vehicle control system of claim 1, wherein the behavioral pattern information stored in the memory portion includes at least one of time when the vehicle is used, a location of the vehicle, and content about operation of the vehicle apparatus.

3. The vehicle control system of claim 1, wherein the receiving portion and the mobile terminal communicate via an information center,
   wherein the memory portion is arranged in one of the vehicle, the mobile terminal, and the information center, and
   wherein the behavioral pattern information stored in the memory portion may be subjected to one of registration, alteration, and deletion via one of the mobile terminal, the information center, and an input/output apparatus arranged in the vehicle.

4. The vehicle control system of claim 1, wherein the receiving portion and the mobile terminal communicate via an information center,
wherein the memory portion is arranged in the vehicle, and
wherein the behavioral pattern information stored in the memory portion may be subjected to one of registration, alteration, and deletion only via the input/output apparatus arranged in the vehicle.

5. The vehicle control system of claim 2, wherein the controlling portion includes a behavior estimation portion that estimates the content about the operation of the vehicle apparatus in accordance with the behavioral pattern information stored in the memory portion, and
wherein the content about the operation of the vehicle apparatus, the content being estimated by the behavior estimation portion, is performed when the distance between the current location of the mobile terminal and the current location of the vehicle is less than a predetermined distance.

6. The vehicle control system of claim 5, wherein the behavioral pattern information further includes a time period of nonuse when the vehicle is not being used by the user, and
wherein the controlling portion prevents the content about the operation of the vehicle apparatus from being performed during the time period of nonuse.

7. The vehicle control system of claim 5, wherein the behavioral pattern information further includes a location of nonuse where the vehicle is not used by the user, and
wherein the controlling portion prevents the content about the operation of the vehicle apparatus from being performed when the vehicle is in the location of nonuse.

* * * * *